(12) United States Patent
Johansson et al.

(10) Patent No.: US 8,594,000 B2
(45) Date of Patent: Nov. 26, 2013

(54) APPARATUS AND METHOD FOR CONTROLLING SELF-INTERFERENCE IN A CELLULAR COMMUNICATIONS SYSTEM

(75) Inventors: Klas Johansson, Sundbyberg (SE); Niilo Musikka, Brooma (SE); Henrik Nyberg, Stockholm (SE); Anders Wallén, Ystad (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/144,784

(22) PCT Filed: Jun. 14, 2011

(86) PCT No.: PCT/SE2011/050731
§ 371 (c)(1),
(2), (4) Date: Jul. 15, 2011

(87) PCT Pub. No.: WO2011/162676
PCT Pub. Date: Dec. 29, 2011

(65) Prior Publication Data
US 2013/0083672 A1    Apr. 4, 2013

Related U.S. Application Data

(60) Provisional application No. 61/357,261, filed on Jun. 22, 2010.

(51) Int. Cl.
*H04B 1/44*   (2006.01)
(52) U.S. Cl.
USPC .......................................... 370/282; 370/328
(58) Field of Classification Search
CPC . H04W 52/146; H04W 52/12; H04W 52/286; H04L 27/2647; H04L 5/0046
See application file for complete search history.

(56) References Cited

U.S. PATENT DOCUMENTS

| | | | | |
|---|---|---|---|---|
| 2006/0008021 A1* | 1/2006 | Bonnet | ........................ | 375/267 |
| 2009/0135748 A1* | 5/2009 | Lindoff et al. | ................ | 370/296 |
| 2010/0130219 A1* | 5/2010 | Cave et al. | .................... | 455/450 |
| 2010/0311433 A1* | 12/2010 | Lindskog et al. | ............. | 455/450 |
| 2011/0222455 A1* | 9/2011 | Hou et al. | ..................... | 370/311 |

OTHER PUBLICATIONS

3rd Generation Partnership Project. "Improved Uplink Load Balancing for MC-HSPA." 3GPP TSG-RAN WG1 Meeting #61, R1-102625, Montreal, Canada, May 10-14, 2010.

(Continued)

*Primary Examiner* — Jung Park
(74) *Attorney, Agent, or Firm* — Coats & Bennett, P.L.L.C.

(57) ABSTRACT

The invention relates to a radio base station (102) and method in a radio base station of a cellular communications system (100) for controlling self-interference. The radio base station (102) supports communication with a user equipment (101) using multiple uplink and multiple downlink carriers (104a, 104b, 105a, 105b). The method comprises detecting a degraded downlink performance on a downlink carrier (105a) due to self-interference by determining that a set of predefined conditions applies. The method further comprises executing, in response to detection of the degraded downlink performance, an action to reduce self-interference between the uplink and downlink carriers (104a, 104b, 105a, 105b). The action is one of: uplink scheduling to reduce self-interference, deactivation of a secondary uplink carrier (14a, 104b), deactivation of a secondary downlink carrier (105a, 105b), and initiation of carrier reconfiguration to reduce self-interference. Accordingly, benefits of using multi-carrier operation may be balanced against a possible associated drawback of degraded downlink performance due to self-interference.

26 Claims, 5 Drawing Sheets

(56) References Cited

OTHER PUBLICATIONS

3rd Generation Partnership Project. "Design Considerations for DC-HSUPA Operation." 3GPP TSG-RAN WG1 Meeting #56bis, R1-091315, Seoul, Korea, Mar. 23-28, 2009.

3rd Generation Partnership Project. "Uplink Load Balancing for 4C-HSDPA." 3GPP TSG-RAN WG1 Meeting #60, R1-101296, San Francisco, California, USA, Feb. 22-26, 2010.

3rd Generation Partnership Project. "Dual Cell Triggering Mechanisms for Scheduling Information." 3GPP TSG-RAN WG2 #68, R2-096637, Jeju, Republic of Korea, Nov. 9-13, 2009.

3rd Generation Partnership Project. "DTX and Carrier Activation/Deactivation for DC-HSUPA." 3GPP TSG-RAN WG1 Meeting #57, R1-091857, San Francisco, USA, May 4-8, 2009.

3rd Generation Partnership Project. "Technical Specification Group Radio Access Network; Solutions for Energy Saving within UTRA Node B." Release 10, TR 25.927, Sophia-Antipolis Cedex, France, May 2010.

\* cited by examiner

APPARATUS AND METHOD FOR CONTROLLING SELF-INTERFERENCE IN A CELLULAR COMMUNICATIONS SYSTEM

TECHNICAL FIELD

The embodiments described herein relate to controlling self-interference in a cellular communications system and in particular to detection and reduction of self-interference between uplink and downlink carriers of a cellular communication system.

BACKGROUND

There is a continuous development of new generations of mobile communications technologies to cope with increasing requirements of higher data rates, improved efficiency and lower costs. High Speed Downlink Packet Access (HSDPA) and High Speed Uplink Packet Access (HSUPA), together referred to as High Speed Packet Access (HSPA), are mobile communication protocols that were developed to cope with higher data rates than original Wideband Code Division Multiple Access (WCDMA) protocols were capable of. The 3rd Generation Partnership Project (3GPP) is a standards-developing organization that is continuing its work of evolving HSPA and creating new standards that allow for even higher data rates and improved functionality.

In a radio access network implementing HSPA, a user equipment (UE) is wirelessly connected to a radio base station (RBS) commonly referred to as a NodeB (NB). A radio base station is a general term for a radio network node capable of transmitting radio signals to a user equipment (UE) and receiving signals transmitted by a user equipment (UE).

Dual-Carrier High-Speed Downlink Packet Access (DC-HSDPA, also known as Dual-Cell HSDPA) was introduced within the 3GPP release 8. DC-HSDPA enables reception of data from two cells simultaneously, where the data is transmitted on two adjacent carriers from the same base station and sector to individual user equipments (UEs) or terminals. The concept of DC-HSDPA is in 3GPP release 10 extended to 4 downlink carrier frequencies known as 4-carrier-HSDPA (4C-HSDPA). With 4-carrier HSDPA the NodeB can schedule downlink transmission to one UE on up to four downlink carriers simultaneously and the UE can use up to two adjacent uplink carriers.

To complement DC-HSDPA, in 3GPP release 9, Dual-Carrier High-Speed Uplink Packet Access (DC-HSUPA) was also introduced. DC-HSUPA enables an individual terminal to transmit data on two adjacent carrier frequencies simultaneously to the radio access network. DC-HSUPA according to 3GPP release 9 is in essence an aggregation of legacy single-carrier HSUPA according to 3GPP release 8.

In multi-cell HSPA/multi-carrier HSPA (MC-HSPA), carriers that can be dynamically activated/deactivated are referred to as secondary carriers. A secondary carrier may be a secondary downlink carrier or a secondary uplink carrier. The uplink and downlink carriers that cannot be deactivated are referred to as primary or anchor carriers. In 3GPP specifications a secondary downlink carrier is also referred to as a secondary serving HS-DSCH (High-Speed Downlink Shared Channel) cell and a secondary uplink carrier is also referred to as a secondary uplink frequency.

One of the important features in MC-HSPA systems is the serving NodeB's ability to dynamically determine which of the downlink carriers that a certain UE needs to listen to and which uplink carriers that a UE should transmit physical control channels and potential payload data on. An obvious reason for activating a secondary uplink or downlink carrier for a certain UE is to increase the instantaneous data rate. The additional spectrum bandwidth associated with multi-carrier operation does not increase "spectral efficiency", i.e. the maximum achievable throughput per cell per Hz [bps/cell/Hz], but the experienced user data rates are increased significantly. In particular, for bursty packet data traffic at low and moderate load, the data rate is proportional to the number of carriers exploited. Moreover, power inefficient higher order modulation schemes can be avoided. This is especially important in the uplink. Furthermore, the practical as well as theoretical peak data rates of the system are naturally increased.

Handover and radio access bearer admission control is presumed to be conducted in a Radio Network Controller (RNC) based on measurements of e.g. path loss on a primary carrier. Notice though, that in case of a distributed radio access network (RAN) architecture where Node-B and RNC functionality, as defined in 3GPP specifications, is collocated in a base station, the base station would naturally handle also these functionalities. In a DC-HSUPA capable Node-B, the secondary carrier is assumed to be configured by the RNC for a given DC-HSUPA capable UE and then scheduled and activated by Node-B whenever feasible and useful. The decision whether to activate a secondary carrier may for example be driven by an objective to maximize the supported traffic volumes or the aggregate system throughput, subject to fairness criteria and quality of service constraints, such as minimum bit rate or maximum latency requirements. As mentioned above, a primary carrier, on the other hand, may not be temporarily deactivated by the Node-B. To deactivate a certain primary carrier for a connection, the connection is either released, or an inter-frequency handover is performed in which case another carrier will become the primary carrier.

For each user connected in DC-HSUPA mode, the serving Node-B hence controls whether or not a secondary carrier is activated, and a separate grant is selected for each activated carrier.

Furthermore, if a secondary carrier is activated by the Node-B, it is assumed that the Dedicated Physical Control Channel (DPCCH), which includes a sequence of pilot bits, is transmitted on that carrier, and the Node-B hence tries to detect this signal.

The minimum separation between the uplink and downlink frequencies may decrease as more downlink and uplink carriers are employed for an individual connection. For bands with small transmitter-receiver frequency separation, this may cause increased self-interference onto the downlink carriers that are closest to the uplink frequencies, thus degrading the performance on these carriers.

SUMMARY

It is an object to provide a method and apparatus that, at least to some extent, allows for controlling of self-interference in a cellular communications system.

The above stated object is achieved by means of a method and radio base station according to the independent claims.

A first embodiment provides a method in a radio base station of a cellular communications system for controlling self-interference. The radio base station is in communication with a user equipment using multiple uplink and multiple downlink carriers. The method comprises detecting a degraded downlink performance on a downlink carrier due to self-interference by determining that a set of predefined conditions applies. The method further comprises executing, in response to detection of the degraded downlink performance, an action to reduce self-interference between the uplink and downlink carriers. The action is one of: uplink scheduling to reduce self-interference, deactivation of a secondary uplink carrier, deactivation of a secondary downlink carrier, and initiation of carrier reconfiguration to reduce self-interference.

A second embodiment provides a radio base station for use in a cellular communications system. The radio base station is capable of communication with a user equipment using multiple uplink and multiple downlink carriers. The radio base station is configured to detect a degraded downlink performance on a downlink carrier due to self-interference by determining that a set of predefined conditions applies. The radio base station is further configured to execute, in response to detection of the degraded downlink performance, an action to reduce self-interference between the uplink and downlink carriers. The action which the radio base station is configured to execute is one of: uplink scheduling to reduce self-interference, deactivation of a secondary uplink carrier, deactivation of a secondary downlink carrier, and initiation of carrier reconfiguration to reduce self-interference.

An advantage of certain embodiments described herein is that benefits of using multi-carrier operation in a cellular communication system may be balanced against a possible associated drawback of degraded downlink performance due to self-interference. Thus it may be possible to utilize the wider bandwidth offered by multi-carrier operation in the uplink, such as MC-HSUPA, as far as possible without jeopardizing downlink performance using e.g. MC-HSDPA in situations where self-interference is significant.

Further advantages and features of embodiments will become apparent when reading the following detailed description in conjunction with the drawings.

DETAILED DESCRIPTION

The present invention will now be described more fully hereinafter with reference to the accompanying drawings, in which different exemplary embodiments are shown. These exemplary embodiments are provided so that this disclosure will be thorough and complete and not for purposes of limitation.

Figure 1:
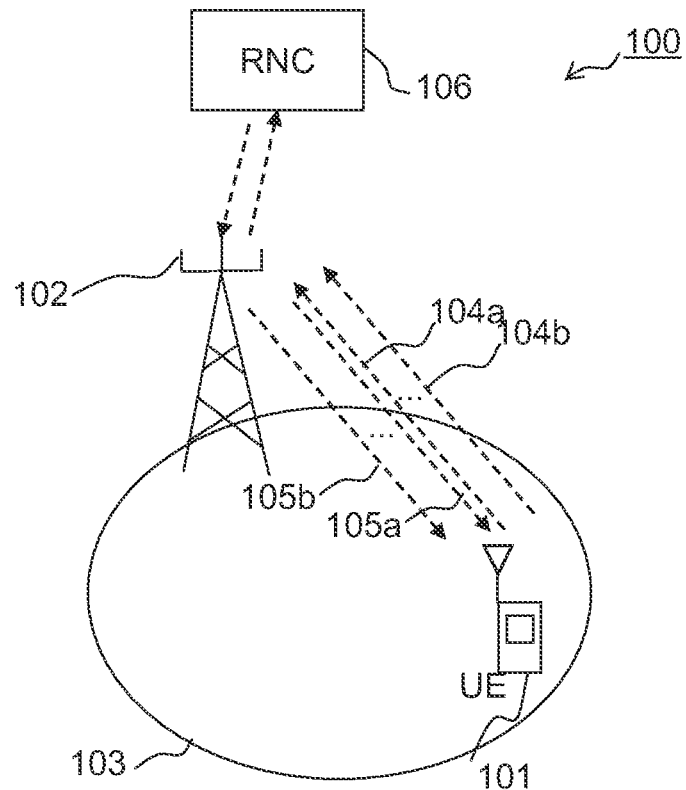
FIG. 1 is a schematic block diagram of a cellular communications system in which embodiments of this disclosure may be implemented.

FIG. 1 illustrates an example of a cellular communications system, in which embodiments of this disclosure may be implemented. The exemplary cellular communications system is a High-Speed Packet Access (HSPA) system. For the sake of simplicity, only those parts of the communication system that are of particular relevance to the embodiments discussed herein are shown. The cellular communications system comprises a cellular network 100, which includes a radio base station 102, serving a user equipment (UE) 101 in a serving cell 103. A radio base station is a common implementation of a NodeB in WCDMA/HSPA so the base station 102 will also be referred to as NodeB 102 herein. The UE 101 is able to communicate with the radio base station 102 via one or multiple uplink carriers 104a, 104b and one or multiple downlink carriers 105a, 105b. FIG. 1 illustrates a scenario where multiple carriers are activated in both the uplink and the downlink. Reference numeral 104a denotes the uplink carrier that is closest to the downlink carriers, i.e. has the smallest frequency separation to the closest downlink carrier, while reference numeral 104b denotes the uplink carrier with the largest frequency separation to the closest downlink carrier. One of the uplink carriers 104a and 104b is configured as the primary uplink carrier, whereas the other one is configured as a secondary uplink carrier. In certain embodiments additional uplink carriers other than the two illustrated uplink carriers 104a and 104b may be used; these additional uplink carriers will then also be configured as secondary uplink carriers. Reference numeral 105a denotes the downlink carrier that is closest to the uplink carriers, i.e. has the smallest frequency separation to the closest uplink carrier, while reference numeral 105b denotes the downlink carrier with the largest frequency separation to the closest uplink carrier 104a. One of the downlink carriers 105a and 105b is configured as the primary downlink carrier, whereas the other one is configured as a secondary downlink carrier. In certain embodiments additional downlink carriers other than the two illustrated downlink carriers 105a and 105b may be used; these additional downlink carriers will then also be configured as secondary downlink carriers. A Radio Network Controller (RNC) 106 controls the radio base station 102, and is, among other things, in charge of management of radio resources in cells for which the RNC 106 is responsible. Carrier configuration may according to the 3GPP standard be achieved by means of Radio Resource Control (RRC) signaling, a control plane signaling connecting the UE 101 and the RNC 106. In particular, according to the 3GPP standard releases 8, 9 and 10 configuration of multiple carriers is done via RRC signaling.

Duplex distance is the distance between corresponding uplink and downlink frequencies, in the 3GPP standard often referred to as the TX-RX frequency separation. Each frequency band is designed to operate with a specific duplex distance. If the duplex distance is small there is a risk for self-interference between uplink and downlink carriers. Self-interference is an undesired effect in wireless communication, in which transmissions from a particular device result in an unwanted signal entering the receiver in the same device. This unwanted signal will then interfere with any desired received signal. Since this self-interference effectively deteriorates the receiver sensitivity, i.e. the ability to successfully receive weak signals, the phenomenon is also referred to as desensitization. One main source of such self-interference is the spectral regrowth caused by non-linear components in the transmitter, such as a power amplifier. Referring to FIG. 1 it can be expected that the self-interference between uplink and downlink carriers is most likely to have a negative effect on the uplink carrier 104a and/or the downlink carrier 105a since those carriers have the smallest frequency separation to carriers in the opposite direction. The minimum distance between an uplink and a downlink carrier is generally smaller when multi-carrier operation is used than when single-carrier operation is used. Furthermore, the aforementioned spectral regrowth tends to extend further in frequency as the bandwidth of the transmitted signal increases, thus increasing the amount of experienced self-interference. Accordingly, self-interference is more likely to become a problem in case of multi-carrier operation than in single-carrier operation.

Several exemplary embodiments described below focus on the case of DC-HSUPA and 4C-HSDPA using contiguous carrier frequencies. However, all concepts are readily extendable to Multi-Carrier HSUPA (MC-HSUPA) operation over more than two uplink carriers, and system configurations wherein the carrier frequencies employed for the respective link direction are non-contiguous. Such non-contiguous carrier frequencies may be located in the same frequency band or in different frequency bands.

Figure 2:
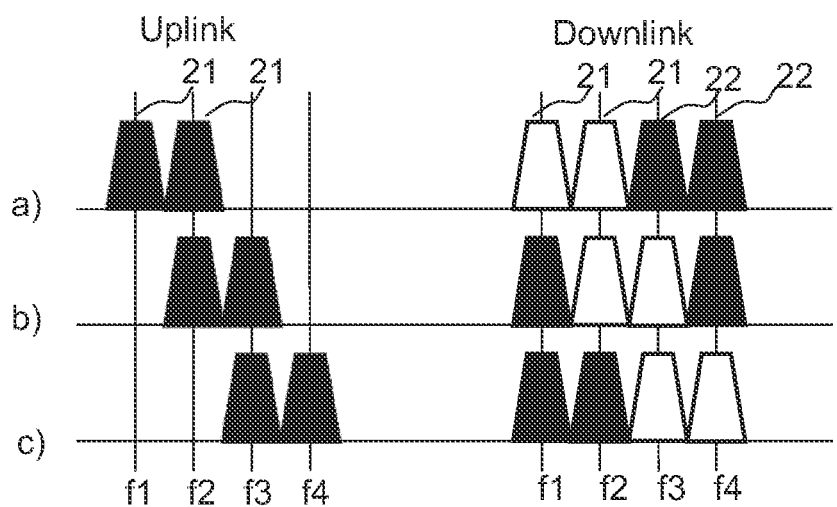
FIG. 2 is a schematic illustration of different frequency arrangements for a system with four downlink carriers in combination with two uplink carriers.

FIG. 2 is a schematic illustration of different possible frequency arrangements that may arise in an example with simultaneous use of two uplink and four downlink carriers, where each uplink carrier is paired with a downlink carrier and the carrier frequencies are contiguous. In DC-HSUPA according to 3GPP release 9 all active uplink carriers need to have a corresponding active downlink carrier. Also in 4-carrier HSDPA according to 3GPP release 10 there is a restriction that mandates that each active uplink carrier has a corresponding active downlink carrier. The primary uplink carrier is paired with the primary downlink carrier, and the secondary uplink carrier is paired with a secondary downlink carrier. In FIG. 2, white trapezoids 21 symbolize carriers that can be used for primary uplink and downlink carriers, while black trapezoids 22 indicate carriers that can only be secondary carriers. Case a) in FIG. 2 indicates that the secondary downlink carriers 22, here referred to as the $3^{rd}$ and $4^{th}$ carriers are placed furthest away from the uplink carriers, case b) with one carrier on each side, and case c) with the $3^{rd}$ and $4^{th}$ carrier being placed as close as possible to the uplink carriers.

It was mentioned above that the self-interference typically is smaller when the minimum distance between the uplink and downlink carriers is as large as possible. However, always placing the secondary downlink carriers, i.e. the $3^{rd}$ and $4^{th}$ carriers as far away as possible in order to avoid terminal receiver quality degradation would impose unnecessary restrictions on the radio access network, and it will cause underutilization of network resources. Therefore it is desired also to configure some terminals (i.e. UEs) according to cases b) and c) in FIG. 2.

One difference between case a), which is similar to DC-HSUPA according to 3GPP release 9, and cases b) and c) is that desensitization occurs mainly for the carrier on downlink frequency f1, which may be the primary carrier for case a) but is always a secondary carrier for cases b) and c). In fact, since the transmitter-receiver separation between the primary carriers is the same, the primary downlink carrier will be affected with similar quality degradation in all cases. Since issues concerning coverage, mobility etc. relate to the primary carrier, it is not expected that having secondary carriers placed between the uplink and downlink primary carriers would have any major impact in this respect. Hence, the embodiments described herein primarily concern desensitization of secondary carriers.

According to certain embodiments the potential performance degradation on the downlink due to increased self-interference is detected by observing degrading downlink channel quality indicator reports known as CQI. When this occurs, the scheduler in the NodeB 102 may, if desired, choose to either:

a) increase the scheduled grant on one uplink carrier and lower the grant on the other uplink carrier,
b) deactivate one of the uplink carriers,
c) deactivate one of the downlink carriers, or
d) reconfigure the UE 101 to a more favorable carrier configuration.

The optimal choice in this respect may depend on several parameters, such as uplink and downlink activity, system load etc.

It can be noted that the performance degradation occurs mainly when the UE 101 transmits almost at its maximum power, with approximately equal power on the uplink carriers, and while the received signal strength in downlink is reasonably low. In fact, assuming two uplink carriers, if the transmitted power on the two uplink carriers is skew, e.g. depending on varying channel quality and the transmitted instantaneous data rate, the transmitted uplink signal looks increasingly like a single uplink carrier signal, and the desensitization problem at hand will be less pronounced.

In practical scenarios, the problem with downlink performance degradation due to self-interference does not apply to all terminals (i.e. UEs). For the terminals that do experience reduced performance however, increased desensitization of a downlink receiver will be reflected by CQI reports for the respective carrier. The network may react to the CQI reports by scheduling actions, deactivating uplink or downlink carrier(s), or even reconfiguring the UE, as deemed appropriate according to different embodiments described in further detail below. As a possible extension of using CQI reports, complementary signaling from the UE 101 could be used to indicate whether the UE experiences the conditions listed above.

Figure 3:
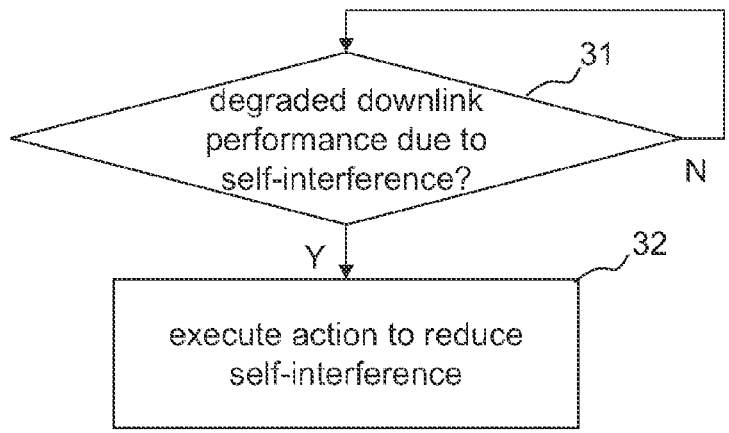
FIG. 3 is a flow diagram illustrating an embodiment of a method for controlling self-interference.

FIG. 3 is a flow diagram illustrating an embodiment of a method in the radio base station 102 for controlling self-interference. The method comprises examining in a step 31 if a degraded downlink performance due to self-interference can be detected on a downlink carrier such as the downlink carriers 105a or 105b. The degraded downlink performance on the downlink carrier is detected in the step 31 by determining that a set of predefined conditions applies. Examples of the predefined conditions will be further discussed and explained below. The method further comprises executing, in response to detection of the degraded downlink performance in the step 31, an action to reduce self-interference between the uplink and downlink carriers in a step 32. The action that is executed to reduce the self-interference is one of: uplink scheduling to reduce self-interference, deactivation of a secondary uplink carrier, deactivation of a secondary downlink carrier, and initiation of carrier reconfiguration to reduce self-interference.

Figure 4:
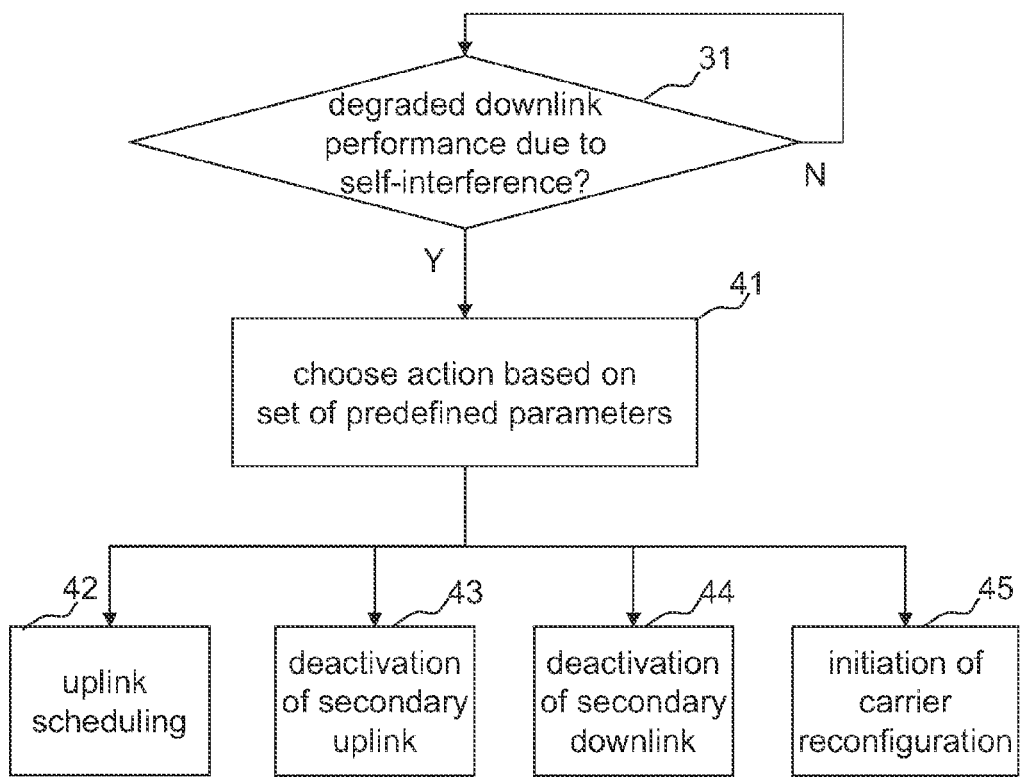
FIG. 4 is a flow diagram illustrating an alternative embodiment of a method for controlling self-interference.

FIG. 4 is a flow diagram illustrating an alternative embodiment of a method in the radio base station 102 for controlling self interference. The first step of the method illustrated in FIG. 4 is the same as the step 31 of FIG. 3 explained above, i.e. examining if a degraded downlink performance due to self-interference can be detected on a downlink carrier. If degraded downlink performance is detected in the step 31, a step 41 is performed in which an action is chosen to reduce self-interference between the uplink and downlink carriers. The action is chosen based on a set of predefined parameters. The set of parameters may comprise one or several parameters indicative of e.g. uplink activity, downlink activity and/or system load. The optimal choice of action varies in different scenarios. If there is a small need for uplink bandwidth it may e.g. be appropriate to deactivate a secondary uplink carrier and if the system is highly loaded there may e.g. be limited possibilities for carrier reconfiguration. By considering appropriate parameters a suitable choice of action to reduce self-interference can be made in the step 41. In FIG. 4 it is illustrated that the chosen action is performed in steps 42, 43, 44 and 45 respectively in which interference is reduced by means of uplink scheduling, deactivation of a secondary uplink carrier, deactivation of a secondary downlink carrier or initiation of carrier reconfiguration to reduce self-interference.

It was mentioned above that degraded downlink performance on the downlink carrier is detected in the step 31 by determining that a set of predefined conditions applies. The set of predefined conditions may according to different embodiments comprise different conditions that are checked in order to determine if the self-interference is significant and harmful for the overall user experience. If the set of predefined conditions is selected appropriately it will provide an indication of the cases in which uplink carriers have a negative impact on downlink performance which it is desirable to try to reduce. Examples of the predefined conditions will now be further discussed and explained.

A first example of a predefined condition is detection of poor CQI, which may be an indication that the UE is close to the cell edge. There are also other ways of detecting that the UE is close to the cell-edge than through detection of poor CQI e.g. based on neighbor cell measurement reports from the UE. Self-interference is more likely to be a problem close to the cell edge than when the UE is near the radio base station. Accordingly CQI reports indicating a downlink channel quality below some predetermined threshold may be a condition that is checked. If the downlink channel quality is poor according to the CQI reports, i.e. below the predetermined threshold it may be of interest to reduce self-interference. A downlink channel quality is above the predetermined threshold may be interpreted as an indication that there is no need to perform any action to reduce self-interference.

A strong indication of a situation where interference from the uplink carrier(s) cause degraded downlink performance is detecting that CQI of the most adjacent carrier 105a is systematically degraded due to self-interference, for example compared to the CQI of the downlink carrier 105b associated with the maximum frequency separation from the uplink carrier(s) and/or compared to the CQI of same downlink carrier 105a when no data transmissions occur in uplink. Accordingly detection of such systematically degraded CQI of the downlink carrier 105a closest to the uplink carriers is a second example of a condition that may be checked in the step 31. This check can be applied simultaneously also to other downlink carriers than the most adjacent one, even though the effect typically is less pronounced as the frequency separation increases.

A third example of a condition that may be comprised in the set of predefined conditions that is checked in the step 31 is whether the UE 101 transmits near its maximum power. If it is detected that the UE 101 transmits near maximum power it may be of interest to try to reduce the impact on the downlink performance from interference caused by the uplink. A threshold may be predetermined to provide an indication of when the UE transmits near maximum power. Assuming a maximum power output of 23 dBm for the UE 101, the threshold for when the UE is considered to transmit near maximum power may e.g. be set to 3-5 dB below maximum power, or 30-50% of maximum power. There are many different ways in which it can be determined if the UE transmits near maximum power. The radio base station 102 may e.g. consider scheduled grant in combination with the UE power headroom to estimate the output power level of the UE. The UE power headroom is available in the radio base station 102 since it is signaled to the radio base station via Scheduling Information in Media Access Control (MAC) layer signaling. There is also an Event 6d specified by 3GPP which indicates that the UE transmits at maximum power. Information on the Event 6d is available in the RNC 106 via RRC signaling and could be useful for carrier reconfiguration. The RNC can inform the radio base station when the Event 6d applies.

A fourth example of a condition that may be checked in the step 31 is detecting if the UE transmit with approximately equal power level on both carriers, assuming two active uplink carriers or at least two uplink carriers in a scenario with more than two active uplink carriers. This information is typically not available explicitly in the radio base station 102. Instead, average received power level on the uplink carriers may be considered by the radio base station 102. For instance, if the difference in received power level between two uplink carriers is below a predetermined threshold the radio base station may consider executing an action to reduce self-interference. Alternatively, signaling information may be embedded in the MAC layer to allow the radio base station 102 to detect if the UE 101 is transmitting at similar power levels on multiple uplink carriers based on reported Cubic Metric or other indicator of applied Maximum Power Backoff.

Another example of conditions that may be checked in the step 31 is uplink and/or downlink activity. It may e.g. be detected if the UE transmits a large file on the downlink and bursty traffic, e.g. small files, only on the uplink. Information on the uplink and/or downlink activity may provide an indication of the impact that an action to try to reduce self-interference can be expected to have.

According to different embodiments described herein, an action to reduce self-interference is executed if a subset or all of the above mentioned exemplary conditions apply.

The uplink carrier(s) will only cause harmful degradation on downlink performance in cases of short duplex distances. If the duplex distance is larger than 80 MHz, self-interference between uplink and downlink carriers is generally not a problem. However if the duplex distance is shorter, e.g. 50 MHz or below, self-interference may be problematic. It can be expected that several of the embodiments described herein are of particular interest where the duplex distance is 40-50 MHz. If the duplex distance is as low as 30 MHz it is likely that multi-carrier operation is not contemplated at all since self-interference between the uplink and downlink carriers can be expected to be a significant problem. Accordingly, a further condition that can be checked in addition to the above mentioned examples of predetermined conditions is whether the duplex distance is below a predetermined threshold. If the duplex distance is above the predetermined threshold, self-interference from the uplink carrier(s) is not expected to be a problem for the downlink performance. If the downlink performance is still degraded there are probably other causes such as interference from a neighbor cell. According to some embodiments the duplex distance is used as a prerequisite that is checked in order to determine whether or not to continue to check for degraded downlink performance due to self-interference in the step 31. Thus, according to some embodiments, the step 31 is only performed when the duplex distance is below the predetermined threshold.

As mentioned above there are different actions that may be executed to reduce self-interference according to the described embodiments. These different actions will now be discussed and explained in further detail.

Uplink scheduling may be a first action that is executed if significant self-interference is detected. The user may be rescheduled to primarily use one carrier. The largest improvement can be expected if it is the uplink carrier with maximum distance relative to the closest, most interfered downlink carrier that is primarily used. But irrespective of which uplink carrier is selected to be primarily used, self-interference can be expected to be reduced due to increased power difference between the uplink carriers. There are different ways of implementing this action. One example is to fill up the uplink scheduling headroom, or load budget, on the carrier with maximum distance first and then schedule the user on the other uplink carrier(s). Another example is to limit the scheduled grant on the carrier closest to the downlink carriers, in other words the carrier with minimum duplex distance. The advantage of applying differentiated grants on the uplink carriers is that the self-interference is reduced due to increased power difference on the uplink carriers. Note that this uplink scheduling action is only feasible in cases with multiple uplink carriers, such as MC-HSUPA.

Another action that may be executed if significant self-interference is detected is, as mentioned above, deactivation of a secondary uplink carrier. If there are two active uplink carriers, only one is the secondary carrier that can be deactivated. The advantage of deactivating the secondary uplink carrier is that a steeper filter may be employed in the UE 101, and that unwanted emissions due to spectral regrowth, cross-modulation products and intermodulation products are reduced. In addition, if the secondary uplink carrier is the carrier closest to the downlink carriers, the effective duplex distance is also increased.

If the quality of one or multiple secondary downlink carriers is systematically very poor, corresponding to a very low contribution to the total achievable data rate for the terminal/UE of interest, the secondary downlink carrier may be deactivated. The advantage of deactivating downlink carriers due to high self interference would be that receiver performance of the still activated downlink carriers can be improved, e.g. by employing a steeper receiver filter.

Yet another action to reduce self interference mentioned above is initiation of carrier reconfiguration. Whereas the secondary carrier activation/deactivation is controlled by the NodeB 102, the carrier configuration may also be changed by the RNC 106. This can according to 3GPP releases 8 and 9 be achieved by means of RRC signaling, a control plane signaling connecting the terminal/UE and the RNC. As the need to reconfigure is envisaged to be detected in the NodeB 102, a signaling between the NodeB 102 and the RNC 106 is required to inform the RNC 106 that a reconfiguration is needed. A reconfiguration could then be executed provided it is feasible and beneficial from an overall resource availability and utilization point of view. In case of high system load it may e.g. not be possible to achieve a more favorable configuration due to lack of available resources. Furthermore, if a reconfiguration can be expected to reduce self-interference between the uplink and downlink carriers but at the same time increase some other interference e.g. with the uplinks of other UEs, it might be better to refrain from reconfiguration.

According to an exemplary embodiment, the RNC selects the uplink carrier(s) with the maximum duplex distance, i.e. with the maximum distance to the downlink carriers, for users that experience unfavorable propagation conditions based on path loss and power usage measurements which are available by means of RRC signaling.

Carrier reconfiguration is an action that is fairly slow, i.e. it takes longer to execute than the other actions to reduce self-interference discussed herein. Note also that carrier reconfiguration actions are feasible both for cases with multi-carrier operation in the uplink, such as MC-HSUPA and for cases with single carrier operation in the uplink in conjunction with multi-carrier operation in the downlink, e.g. HSUPA in conjunction with MC-HSDPA.

Different of the above mentioned actions may be preferred from different perspectives. From the perspective of the UE it may be preferred to deactivate a secondary uplink carrier rather than to reduce self-interference by means of an uplink scheduling action as discussed above, since the former action would result in the lowest power consumption in the UE. Furthermore, depending on the current uplink/downlink traffic needs, it may in different situations be more beneficial to maximize either the uplink or the downlink throughput. Accordingly the different actions may be given different priorities and may be considered and/or executed in different orders depending on their assigned priorities.

Figure 5:
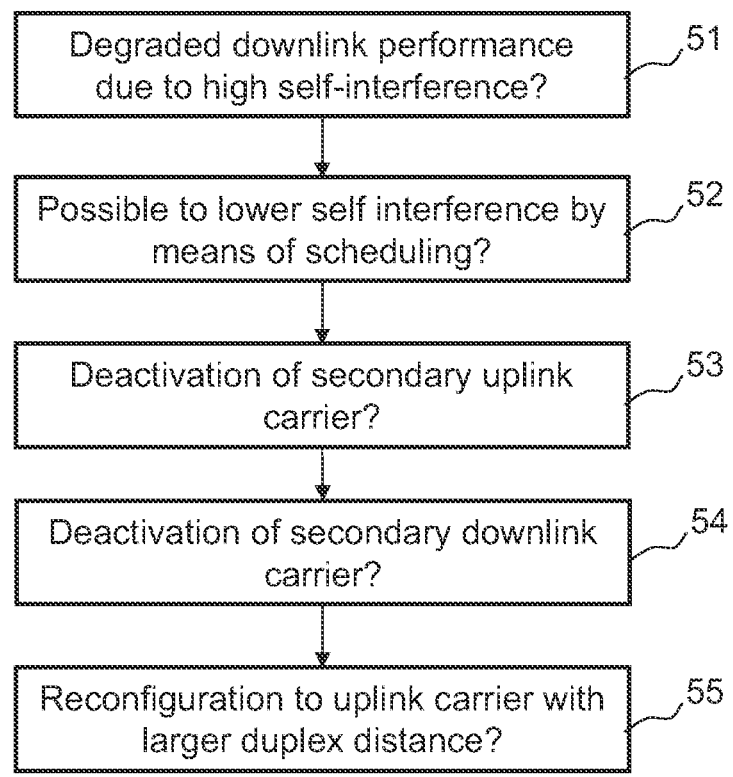
FIG. 5 is a flow diagram illustrating another alternative embodiment of a method for controlling self-interference.

FIG. 5 is a flow chart illustrating an embodiment of a method to reduce self-interference. In a step 51 it is examined if down link performance is degraded due to high self-interference. If high self-interference is detected, it is considered in a step 52 if it is possible to lower self-interference by means of scheduling. As a further step 53 it is considered if it is possible to deactivate a secondary uplink carrier to reduce self-interference. In a step 54 it is considered if it is possible to deactivate a secondary downlink carrier to reduce self-interference and in a step 55 it is examined if reconfiguration to uplink carrier(s) with larger distance to the downlink carriers is possible.

Figure 6:
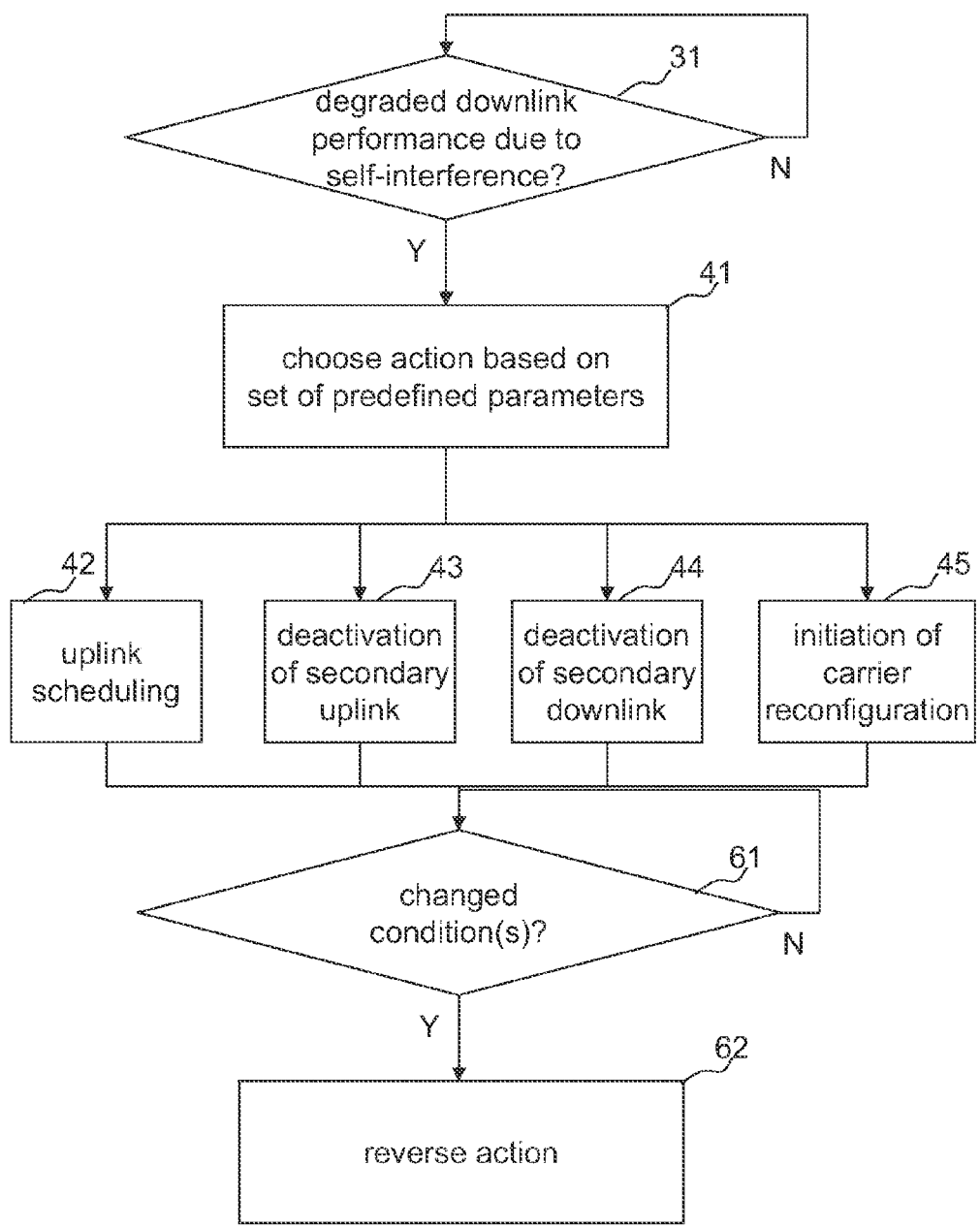
FIG. 6 is a flow diagram illustrating yet another alternative embodiment of a method for controlling self-interference.

It can be noted that if the situation changes, e.g. after having performed the method illustrated in FIG. 3 or FIG. 4, such that CQI is increased, the UE transmits on a low total transmit power, or the UE transmits with skew transmit power on the uplink carriers, the actions described above for reducing self-interference can be reversed. FIG. 6 is a flow chart illustrating such an embodiment. The method illustrated in FIG. 6 comprises the steps 31, 41, 42, 43, 44 and 45 described above in connection with FIG. 4. In a further step 61 it is detected if the conditions are changed such that one or several conditions examined in step 31 no longer applies. If this is the case one or several of the actions according to the steps 42, 43, 44 and 45 is reversed in a step 62. Thus a secondary uplink carrier and/or downlink carrier may be activated and scheduling may be allowed on both uplink carriers in case of two active uplink carriers. In the step 61 different thresholds may be set to determine when the situation has changed such that the step 62 is triggered. According to exemplary embodiments the step 62 is triggered if CQI reports indicate a downlink channel quality above a predetermined threshold, the user equipment transmits at a power level below a predetermined threshold, and/or the user equipment transmits with a power level difference between the uplink carriers which is above a predetermined threshold.

Figure 7:
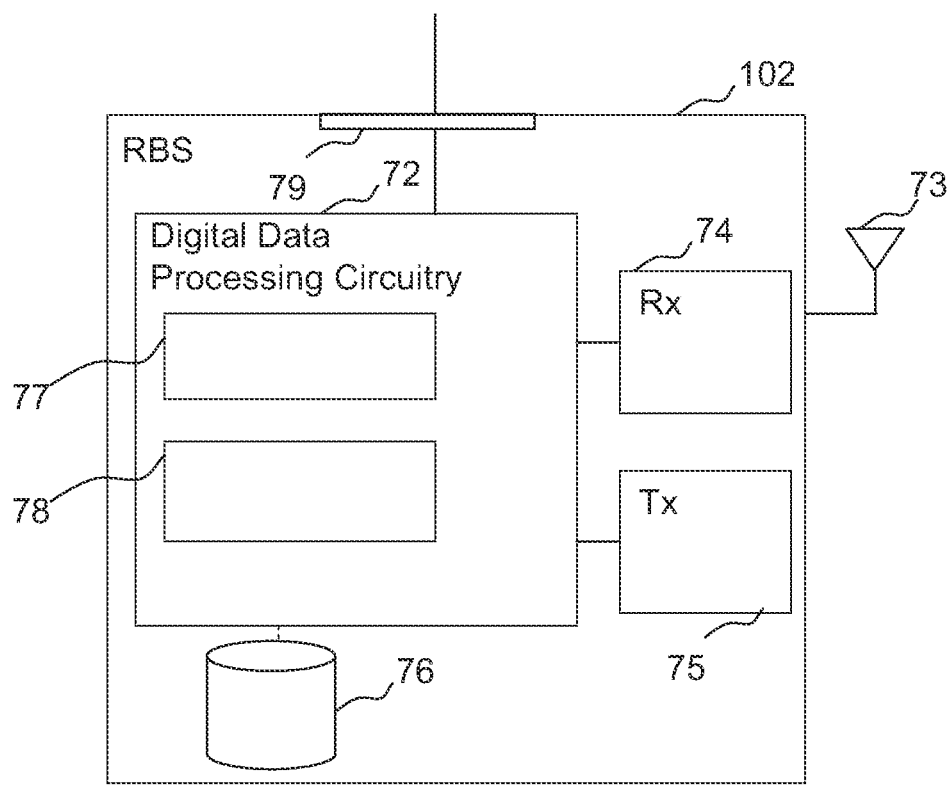
FIG. 7 is a schematic block diagram of a radio base station according to an embodiment of this disclosure.

FIG. 7 is a schematic block diagram of an exemplary embodiment of the radio base station 102 adapted to perform any of the above described embodiments of a method for controlling self-interference such as the methods illustrated in FIGS. 3-6. As illustrated in FIG. 7, the radio base station 102 comprises digital data processing circuitry 72, one or several antennas 73, receiver circuitry 74 for reception of data messages, transmitter circuitry 75 for transmission of data messages, and an interface 79 for communication with higher level nodes such as the RNC 106 illustrated in FIG. 1. The receiver circuitry 74 and transmitter circuitry 75 may alternatively be integrated in a transceiver unit. The receiver circuitry 74 is particularly adapted to receive signaling messages which may comprise information required to determine if a predetermined condition applies according to the step 31. The transmitter circuitry 75 is particularly adapted to transmit signaling messages to a UE to execute any of the actions to be executed according to the steps 32, 42, 43 or 44. Any signaling message transmitted to the RNC when executing the steps 32 or 45 would be transmitted over the interface 79. The digital data processing circuitry 72 is particularly configured to perform or control the method steps illustrated in one or several of FIGS. 3-6. For this purpose the digital data processing circuitry 72 may be configured with different modules. In FIG. 7, two exemplary modules 77 and 78 are illustrated. The module 77 is a module for detecting degraded downlink performance due to self-interference. The module 78 is a module for controlling execution of actions to reduce self-interference. The modules 77 and 78 are merely some examples and other modules may be used in alternative embodiments. The modules 77 and 78 would generally be program modules implemented in software, although implementations completely or partly in firmware, hardware or combinations thereof are also feasible. Program modules may be comprised in one or several computer program products embodied in the form of a volatile or non-volatile memory, e.g. a RAM, an EEPROM, a flash memory or a disc drive. The radio base station 102 in FIG. 7 also includes a memory 76. In case the modules 77 and 78 are program modules, these may be stored by the memory 76 and executed by the digital data processing circuitry. The digital data processing circuitry 72 may be embodied in the form of one or more programmable processors programmed to perform the steps according to one or several of FIGS. 3-6. However, any data processing circuitry or combination of different types of processing circuits that is capable of performing the mentioned steps could be used.

From the description above it is apparent that an advantage of some embodiments described above is that they make it possible to utilize the wider bandwidth offered by MC-HSUPA as far as possible, without jeopardizing MC-HSDPA performance in situations where self-interference is significant.

Another advantage of some of the embodiments presented herein is that self-interference for multi-carrier systems may be reduced. Some embodiments concern adapting scheduling, carrier deactivation/activation, and configuration with the purpose to minimize self-interference.

Yet another advantage of some of the embodiments presented herein is that they are simple to implement. According to some embodiments, merely a software update of an existing radio base station is required to implement the embodiments. Accordingly the embodiments may not require any new hardware. In addition, already standardized measurements and signaling may be used in different embodiments as described above, which also facilitates implementation.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method in a radio base station of a cellular communications system for controlling self-interference, wherein the radio base station communicates with a user equipment using multiple uplink and multiple downlink carriers, the method comprising:
   detecting a degraded downlink performance on at least one of said multiple downlink carriers due to self-interference by determining that a set of predefined conditions applies, wherein said set of predefined conditions includes the following conditions:
      a duplex distance below a predetermined first threshold, and
      channel quality indicators associated with the downlink carrier closest to the uplink carriers systematically indicate degraded performance due to self-interference; and
   executing, in response to detection of the degraded downlink performance, an action to reduce self-interference between the uplink and downlink carriers, wherein said action comprises one of:
      uplink scheduling to reduce self-interference,
      deactivation of a secondary uplink carrier,
      deactivation of a secondary downlink carrier, and
      initiation of carrier reconfiguration to reduce self-interference.

2. The method according to claim 1, wherein said set of predefined conditions further includes one or more of the following conditions:
   channel quality indicator reports indicating a degrading downlink channel quality,
   the user equipment transmits at near maximum power of the user equipment,
   the user equipment transmits with approximately equal power level on the uplink carriers, and
   channel quality indicators associated with the downlink carrier closest to the uplink carriers systematically indicate degraded performance due to self-interference.

3. The method according to claim 1, wherein it is detected that the channel quality indicators associated with the downlink carrier closest to the uplink carriers systematically indicate degraded performance due to self-interference by:
   detecting the channel quality indicators associated with the downlink carrier closest to the uplink carriers systematically indicate worse channel quality than what is indicated by channel quality indicators associated with the downlink carrier with the largest frequency separation from the uplink carriers, or
   detecting the channel quality indicators associated with the downlink carrier closest to the uplink carriers systematically indicate worse channel quality for occasions when transmission occurs on the uplink carriers than for occasions when no transmission occurs on the uplink carriers.

4. The method according to claim 1, wherein said action of uplink scheduling to reduce self-interference comprises scheduling to primarily use one first uplink carrier.

5. The method according to claim 4, wherein scheduling to primarily use the first uplink carrier comprises at least one of:
   filling up the uplink scheduling headroom of the first uplink carrier before scheduling on another uplink carrier; and
   limiting a scheduled grant on a second uplink carrier different from the first uplink carrier.

6. The method according to claim 4, wherein said first uplink carrier comprises the uplink carrier with the largest frequency separation from the closest downlink carrier.

7. The method according to claim 1, wherein said action of deactivation of the secondary uplink carrier comprises deactivating the secondary uplink carrier with the smallest frequency separation from the closest downlink carrier.

8. The method according to claim 1, wherein said action of deactivation of the secondary downlink carrier comprises deactivating the secondary downlink carrier with the smallest frequency separation to the closest uplink carrier.

9. The method according to claim 1, wherein said action of initiation of carrier reconfiguration to reduce self-interference comprises sending a signaling message to a radio network controller to request carrier reconfiguration.

10. The method according to claim 1, further comprising choosing the action to execute based on a set of predefined parameters comprising at least one of an uplink activity, a downlink activity, and a system load.

11. The method according to claim 1, further comprising, in response to detecting that a condition of said set of predefined conditions no longer applies, executing a reversal action comprising one of:
uplink scheduling,
activation of a secondary uplink carrier,
activation of a secondary downlink carrier, and
initiation of carrier reconfiguration.

12. The method according to claim 11, wherein executing said reversal action comprises executing said reversal action if one or more of the following occurs:
the channel quality indicator reports indicate increased downlink channel quality,
the user equipment transmits on a low total transmit power, and
the user equipment transmits with skew transmit power on the uplink carriers.

13. The method according to claim 1, wherein said radio base station comprises a NodeB and wherein said cellular communications system supports Multi-Carrier High Speed Uplink Packet Access.

14. A radio base station for use in a cellular communications system, wherein the radio base station communicates with a user equipment using multiple uplink and multiple downlink carriers, the radio base station comprising a data processor configured to:
detect a degraded downlink performance on at least one of said multiple downlink carriers due to self-interference by determining that a set of predefined conditions applies, wherein said set of predefined conditions includes the following conditions:
a duplex distance below a predetermined first threshold, and
channel quality indicators associated with the downlink carrier closest to the uplink carriers systematically indicate degraded performance due to self-interference; and
execute, in response to detection of the degraded downlink performance, an action to reduce self-interference between the uplink and downlink carriers, wherein said action comprises one of:
uplink scheduling to reduce self-interference,
deactivation of a secondary uplink carrier,
deactivation of a secondary downlink carrier, and
initiation of carrier reconfiguration to reduce self-interference.

15. The radio base station according to claim 14, wherein said set of predefined conditions further includes one or more of the following conditions:
channel quality indicator reports indicating a degrading downlink channel quality,
the user equipment transmits at near maximum power of the user equipment,
the user equipment transmits with approximately equal power level on the uplink carriers, and
channel quality indicators associated with the downlink carrier closest to the uplink carriers systematically indicate degraded performance due to self-interference.

16. The radio base station according to claim 14, wherein the data processor detects that the channel quality indicators associated with the downlink carrier closest to the uplink carriers systematically indicate degraded performance due to self-interference by:
detecting the channel quality indicators associated with the downlink carrier closest to the uplink carriers systematically indicate worse channel quality than what is indicated by channel quality indicators associated with the downlink carrier with the largest frequency separation from the uplink carriers, or
detecting the channel quality indicators associated with the downlink carrier closest to the uplink carriers systematically indicate worse channel quality for occasions when transmission occurs on the uplink carriers than for occasions when no transmission occurs on the uplink carriers.

17. The radio base station according to claim 14, wherein said action of uplink scheduling to reduce self-interference comprises scheduling to primarily use one first uplink carrier.

18. The radio base station according to claim 17, wherein said data processor schedules to primarily use the first uplink carrier by at least one of:
filling up the uplink scheduling headroom of the first uplink carrier before scheduling on another uplink carrier; and
limiting a scheduled grant on a second uplink carrier different from the first uplink carrier.

19. The radio base station according to claim 17, wherein said first uplink carrier comprises the uplink carrier with the largest frequency separation from the closest downlink carrier.

20. The radio base station according to claim 14, wherein said data processor executes said action of deactivation of the secondary uplink carrier by deactivating the secondary uplink carrier with the smallest frequency separation from the closest downlink carrier.

21. The radio base station according to claim 14, wherein said data processor executes said action of deactivation of the secondary downlink carrier by deactivating the secondary downlink carrier with the smallest frequency separation to the closest uplink carrier.

22. The radio base station according to claim 14, wherein said data processor executes said action of initiation of carrier reconfiguration to reduce self-interference by sending a signaling message to a radio network controller to request carrier reconfiguration.

23. The radio base station according to claim 14, wherein the data processor chooses the action to execute based on a set of predefined parameters comprises at least one of an uplink activity, a downlink activity, and a system load.

24. The radio base station according to claim 14, wherein the data processor is further configured to, in response to detecting that a condition of said set of predefined conditions no longer applies, execute a reversal action comprising one of:
uplink scheduling,
activation of a secondary uplink carrier,
activation of a secondary downlink carrier, and
initiation of carrier reconfiguration.

25. The radio base station according to claim 24, wherein the data processor executes said reversal action if one or more of the following occurs:
the channel quality indicator reports indicate increased downlink channel quality,
the user equipment transmits on a low total transmit power, and
the user equipment transmits with skew transmit power on the uplink carriers.

26. The radio base station according to claim 14, wherein the radio base station comprises a NodeB and wherein said cellular communications system supports Multi-Carrier High Speed Uplink Packet Access.

* * * * *